United States Patent [19]

Ellis

[11] Patent Number: 4,544,334
[45] Date of Patent: Oct. 1, 1985

[54] MECHANICAL MEANS FOR HOLDING AIR GAPS ON BOLT-DOWN STATORS IN REFRIGERANT COMPRESSORS

[75] Inventor: Charles B. Ellis, Fort Worth, Tex.

[73] Assignee: Lennox Industries, Inc., Ft. Worth, Tex.

[21] Appl. No.: 584,762

[22] Filed: Feb. 29, 1984

[51] Int. Cl.[4] .................. F04B 35/04; H02K 15/14
[52] U.S. Cl. ........................... 417/360; 417/363; 417/419; 417/902; 310/90; 29/596
[58] Field of Search ............. 417/363, 902, 415, 360, 417/419; 310/90; 29/596; 248/638

[56] References Cited

U.S. PATENT DOCUMENTS

| | | | |
|---|---|---|---|
| 2,861,785 | 11/1958 | De Angelis | 310/90 |
| 3,185,099 | 5/1965 | Spring | 417/363 |
| 3,348,300 | 10/1967 | Lindgren | 29/596 |
| 3,356,293 | 12/1967 | Butts | 417/363 |
| 3,897,177 | 7/1975 | Parker | 417/363 |
| 4,147,319 | 4/1979 | Tsybulnik et al. | 248/638 |

FOREIGN PATENT DOCUMENTS 2003218 7/1971 Fed. Rep. of Germany ...... 417/360

Primary Examiner—Cornelius J. Husar
Assistant Examiner—Peter M. Cuomo
Attorney, Agent, or Firm—Allegretti, Newitt, Witcoff & McAndrews, Ltd.

[57] ABSTRACT

A refrigerant compressor (10) including a compression mechanism (18) resiliently supported within a sealed outer casing (12) is provided with means for maintaining the air gap between the rotor (40) and stator (42) of the electric drive motor (20) for the compression mechanism. The rotor is secured to a drive shaft or crankshaft (26) journaled in the compression mechanism. The stator is bolted to the compression mechanism. The means for maintaining the air gap comprises a plurality of balls made from a relatively hard material, which are indented into the relatively softer material of the stator and of the compressor body during assembly of the stator to the compressor body. The stator is fixed relative to the compressor body and to the rotor journaled in the compressor body, thus maintaining the air gap between the stator and the rotor during shipping and handling.

9 Claims, 4 Drawing Figures

MECHANICAL MEANS FOR HOLDING AIR GAPS ON BOLT-DOWN STATORS IN REFRIGERANT COMPRESSORS

BACKGROUND OF THE INVENTION

This invention pertains to a refrigerant compressor and, more particularly to a refrigerant compressor having means for holding the air gap between the rotor and stator of the electric drive motor for the refrigerant compressor.

One known form of hermetic refrigerant compressor comprises an outer housing or casing having compression mechanism resiliently supported therein. The compression mechanism comprises a body formed with cylinders and pistons movable in the cylinders. A drive shaft or crankshaft journaled in the body is operatively secured to the pistons for driving same.

An electric motor is disposed in the outer housing for driving the drive shaft. The electric motor includes a rotor connected to the drive shaft, and, a stator connected by bolts to the body. The establishment and maintenance of a proper air gap between the stator and rotor is essential for optimum performance of the electic motor during shipping and handling of refrigerant compressors as described, the stator will sometimes shift with respect to the rotor, altering the air gaps, with the result that the refrigerant compressor will be difficult or impossible to start. This may occur, for example, if the compressor is dropped several feet onto its side during shipment.

An object of the present invention is to provide an improved method of fabricating a refrigerant compressor having a bolt down stator so as to maintain the desired air gap between the rotor and the stator during shipment and handling.

Another object of the present invention is to provide a refrigerant compressor containing an electric drive motor having a bolt down stator with means for maintaining the air gap between the stator and the rotor, even during rough handling or dropping of the refrigerant compressor. Other objects and advantages of the present invention will be made more apparent hereinafter.

BRIEF DESCRIPTION OF THE DRAWING

There is shown in the attached drawing a presently preferred embodiment of the present invention wherein like numerals in the various views refer to like elements and wherein:

FIG. 2 is a transverse cross-sectional view of the refrigerant compressor taken generally along the line 2—2 of FIG. 1.

DETAILED DESCRIPTION OF THE PRESENT INVENTION

Figure 1:
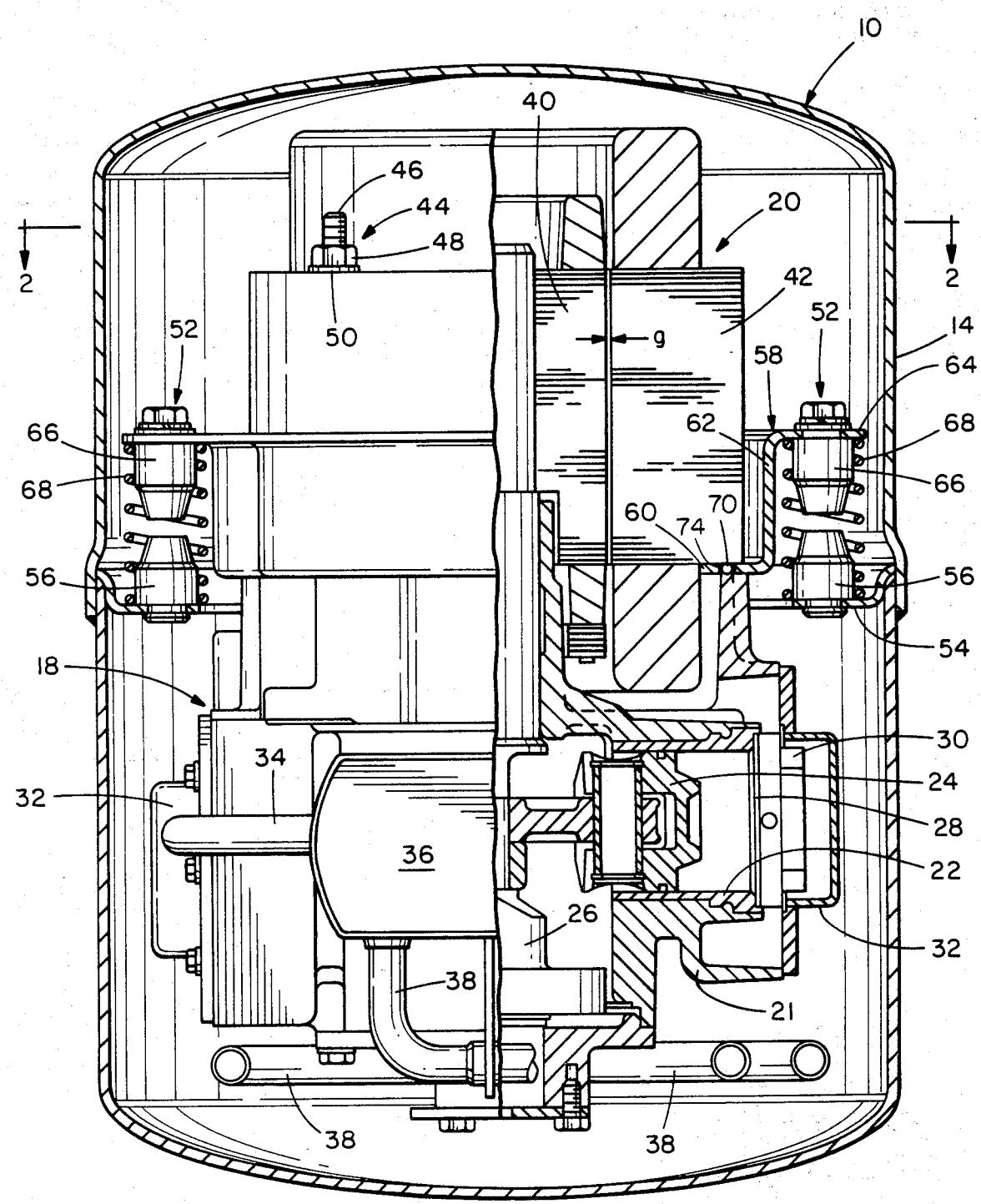
FIG. 1 is a vertical cross-sectional view of a refrigerant compressor incorporating the present invention.

Referring to FIGS. 1 and 2 there is illustrated a refrigerant compressor 10 having an electric motor with a bolt down stator and embodying the means of this invention for maintaining the air gap between the rotor and stator of the electric motor.

The refrigerant compressor 10 comprises an outer housing or casing 12 having upper and lower shells 14 and 16 secured together, as for example by welding.

Resiliently supported within the outer housing 12 is a compression mechanism 18 and an electric drive motor 20. The compression mechanism 18 includes a compressor body 21 having a plurality of cylinders 22, each with a piston 24 movable therein. The pistons 24 are operatively connected to a vertically extending crankshaft or drive shaft 26, that is journalled in the body 21. Valve means comprising suction valve 28 and discharge valve 30 are provided adjacent the end of the cylinder 22. A head 32 closes the end of the cylinder.

A discharge tube 34 connects each head 32 with muffler 36. A discharge loop 38 connected to the muffler 36 carries discharge gas from the muffler 36, through the refrigerant compressor, to the discharge line of a refrigerant system incorporating the refrigerant compressor 10.

The electric drive motor 20 comprises a rotor 40 secured to the crankshaft 26 and a stator 42 joined to the compressor body 21 by bolt means 44. The bolt means 44 comprise bolts 46 that extend from compressor body 21 through the stator 42 and nuts 48 threaded onto the bolts 46 to secure the stator 42 in place. Washers 50 are provided between the stator 42 and each nut 48.

The resilient means 52 for resiliently supporting the compression mechanism 18 in the outer casing 12 comprises an annular mounting ring 54 secured to the outer casing 12. The mounting ring 54 has a central opening therein that is spaced from compressor body 21 of the compression mechanism 18 so as not to interfere with movement of the compressor body 21 relative to the outer casing 12. A plurality of spring guides 56 are secured to the mounting ring 54. A second annular mounting ring 58 has a flange 60 secured between the stator 42 and the body 21. The mounting ring 58 includes an upright portion 62 and an upper flange 64, which is spaced from the outer casing 12. A plurality of guides 66 are secured to the upper flange 64 of mounting ring 58. The spring guides 56, 66 are in vertically aligned disposition or juxtaposed one above the other. Spring 68 is positioned over the guides 56, 66 between flanges of the mounting rings 54, 58. The resilient means 52 are spaced equidistantly from one another. As best seen in FIG. 2, four resilient means 52 are employed in one presently preferred embodiment of the present invention.

In prior refrigerant compressors embodying bolt-down stators, it was necessary to machine the stator and compressor body to close tolerances to establish a rigid connection between the stator and the compressor body. Die marks were suggested on the mounting ring secured between the stator and the compressor body. This was, however, found to be inadequate in many cases to prevent shifting of the stator relative to the compressor body during shipping and rough handling.

The present invention is directed to novel means for maintaining the air gap between the rotor and stator by fixedly retaining the bolted down stator 42 relative to the compressor body 21 in a simple, but effective fashion. Means 70 comprises a plurality of spherical members disposed equidistantly about the center axis of the crankshaft 26 and disposed between the stator 42 and the body 21. As shown in FIG. 2, four spherical members 70 are used in the disclosed form of the invention.

The spherical members may comprise relatively hard balls that fit within holes 74 in the flange 60 of mounting ring 58. The diameter of the balls is greater than the thickness of the flange 60. Preferably, the material from which the spherical members 70 is fabricated is harder than the materials from which the stator 42, and body 21 are fabricated. In one present embodiment, stator 42 is made from relatively soft iron and the compressor body 21 is made from relatively soft aluminum, whereas the balls 70 are made from steel.

Figure 3:
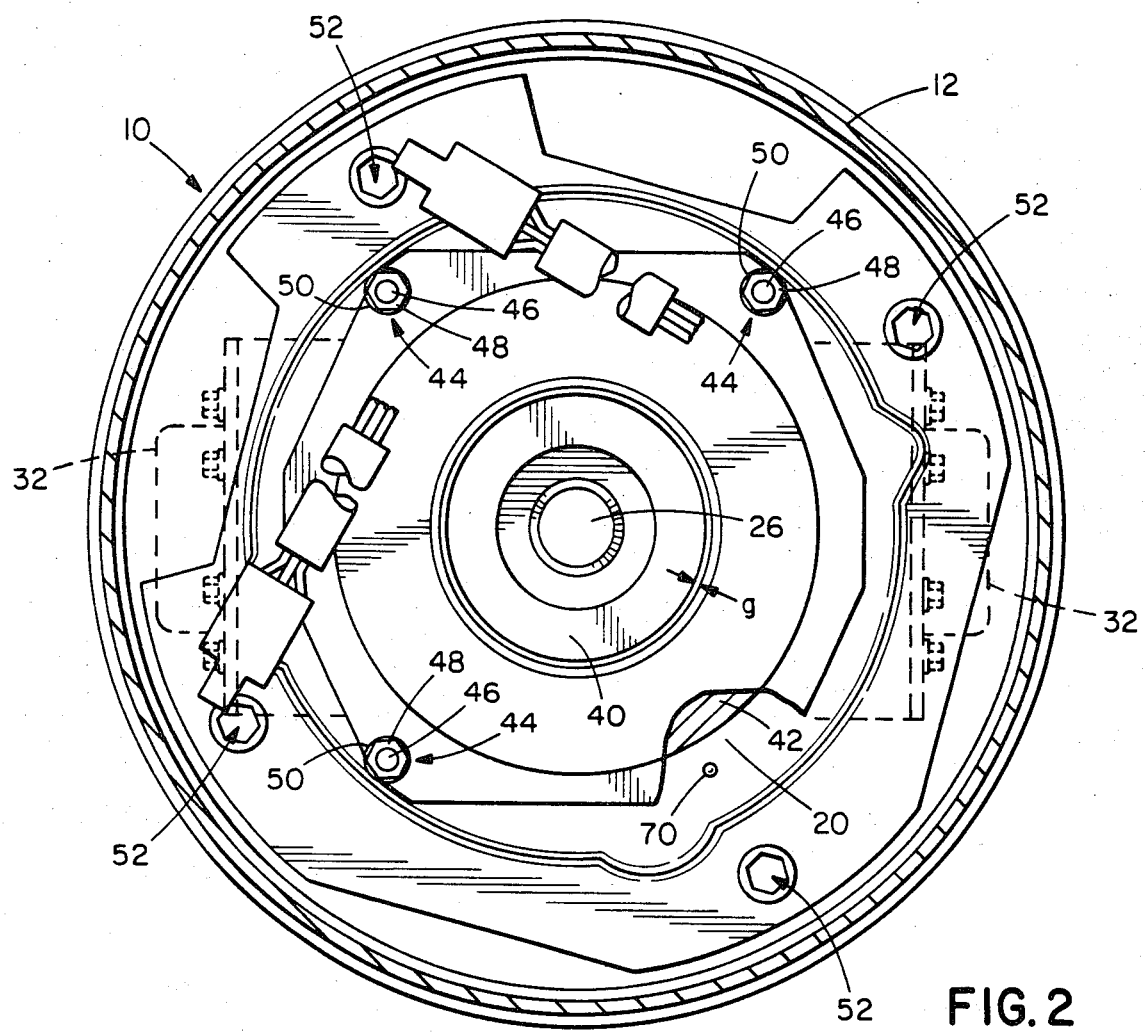
FIG. 3 is an enlarged detail view better illustrating the means of the present invention for maintaining the air gap between the rotor and stator.
Figure 4:
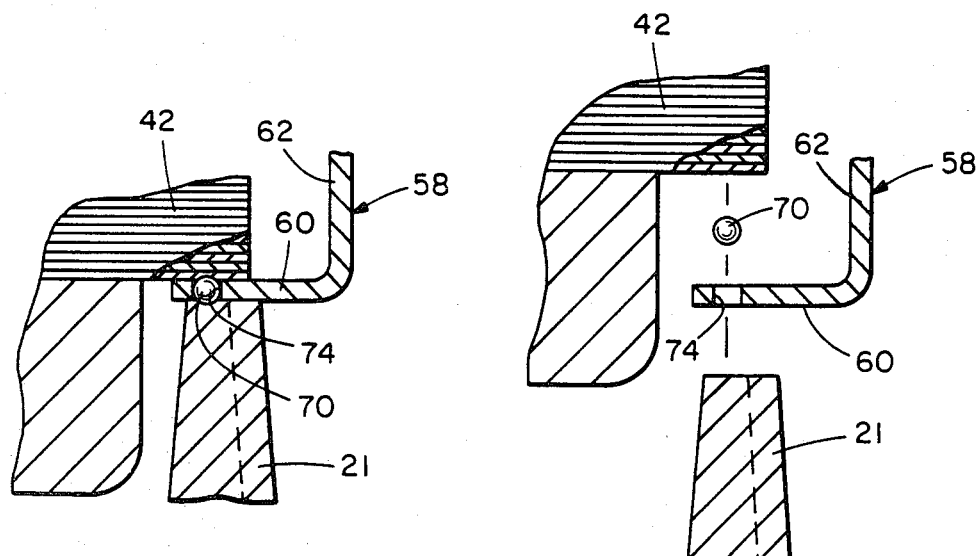
FIG. 4 is an exploded detail view illustrating the means of the present invention for maintaining the air gap between the rotor and stator.

Turning to FIGS. 3 and 4, there is shown in detail the connection between compressor body 21, flange 60 of mounting ring 58, stator 42, and ball 70. In assembly, the ball 70 is located in hole 74 of flange 60 between the stator 42 and the compressor body 21. The nuts 48 are tightened so as to force the balls 70 to indent into the relatively softer stator 42 and the relatively softer compressor body 21. The stator 42 will be fixed relative to the compressor body 21 and the crankshaft rotor 26, which is journalled within the compressor body 21. Thus, the air gap g will be maintained between the rotor 40 and the stator 42.

With reference to one embodiment of the present invention, the ball 70 is six millimeters or 0.236 inch in diameter and the flange 60 of mounting ring 58 is 0.134 inch thick. The ball 70 will penetrate about 0.05 inch into the relatively soft iron stator 42 and about 0.05 inch into the relatively soft aluminum compressor body 21. The stator 42 and compressor body 21 need not be machined to close tolerances as required heretofore. In initial tests, refrigerant compressors 10 embodying the present invention have withstood free falls from six feet onto the side of the refrigerant compressor, without displacing the air gap g.

The present invention provides a simple and expeditions solution to an existing problem in current refrigerant compressors utilizing bolt-down stators. The air gap between the rotor and stator of the electric motor is maintained by utilization of a plurality of relatively hard balls between the relatively soft stator and the relatively soft compressor body, which balls are indented into the stator and compressor body during assembly.

While I have shown and described a presently preferred embodiment of the present invention, it will be understood that modifications may be made within the scope of the appended claims.

I claim:

1. In a refrigerant compressor including compression mechanism comprising a body, cylinder means within said body, piston means movable within said cylinder means, and a drive shaft for driving said piston means and motor means for actuating said drive shaft including rotor means and stator means, there being an air gap between the stator means and the rotor means, said rotor means being operatively connected to said drive shaft, the improvement comprising means for maintaining the air gap between the rotor means and the stator means disposed between the stator means and the body for the compression mechanism, said maintaining means including a plurality of spherical members indented into and secured between the stator means and the body for the compression mechanism.

2. A refrigerant compressor as in claim 1 including an outer casing and resilient means for resiliently mounting the compression mechanism in the outer casing.

3. A refrigerant compressor as in claim 2 wherein the resilient means includes a mounting ring having a flange with a plurality of spaced openings therein and the means for maintaining the air gap includes said plurality of spherical members, with one spherical member positioned in a spaced opening between the stator means and the body for the compression mechanism.

4. A refrigerant compressor as in claim 3 wherein the diameter of the spherical member is greater than the thickness of the flange of the mounting ring.

5. A refrigerant compressor as in claim 4 wherein the spherical member is made from a material harder than the material of the stator means and of the compression mechanism.

6. A refrigerant compressor as in claim 5 wherein the stator means is secured to the body of the compression mechanism by bolt means.

7. A refrigerant compressor as in claim 6 wherein the sphercial members are indented into the stator means and the body of the compression mechanism when the stator means is firmly bolted in place.

8. A method of assembling a refrigerant compressor having a compression mechanism with a drive shaft and an electric motor, including a rotor means and a stator means, said rotor means being mounted on said drive shaft there being an air gap between the rotor means and the stator means of the electric motor, the method operating to maintain the air gap between the rotor means and the stator means of the electric motor comprising the steps of orienting the stator means relative to the compression mechanism, placing a plurality of spherical members between the stator means and the compression mechanism, and securing the compression mechanism to the stator means by indenting the spherical members into the stator means and the compression mechanism, respectively, whereby the position of the rotor means on the drive shaft will be fixed relative to the stator means, thus maintaining the air gap after assembly.

9. The method of claim 8 wherein the material of the stator means and the material of the compression mechanism are relatively soft as compared to the material of the spherical members, including the step of bolting the relatively soft stator means firmly to the relatively soft compression mechanism so as to indent the relatively hard spherical members into the stator means and the compression mechanism, respectively.

* * * * *